Aug. 30, 1966       E. A. JORDAN         3,268,967
              CHAIN HOOK ATTACHMENT
                Filed Oct. 19, 1964
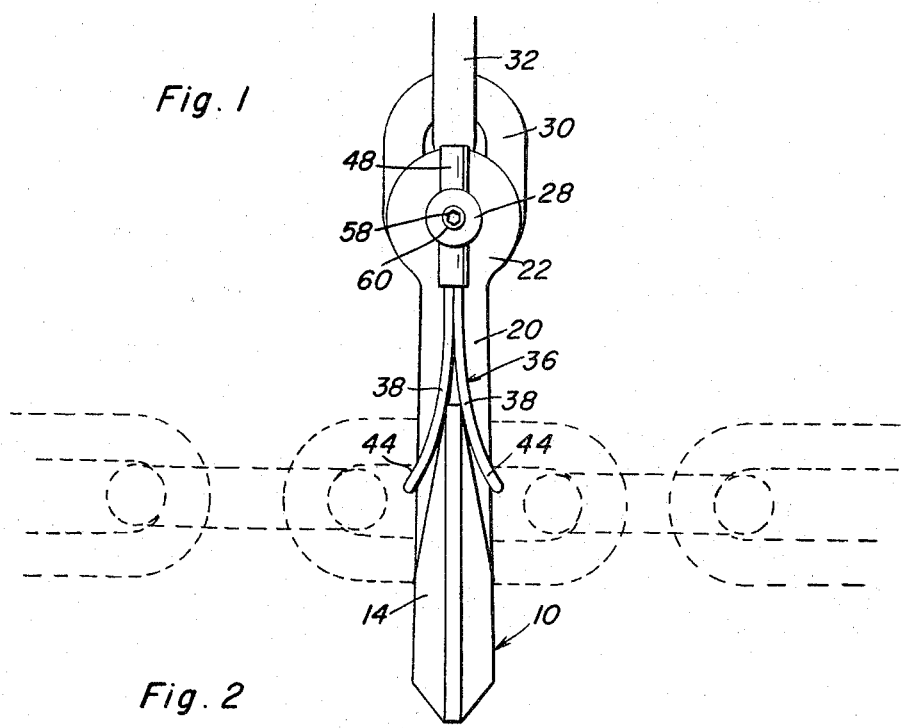
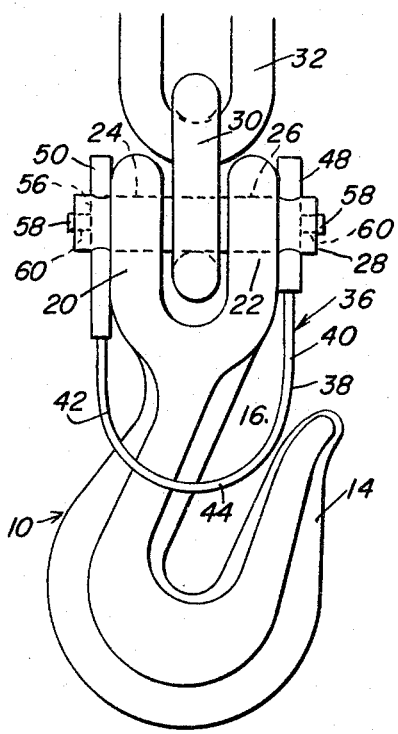
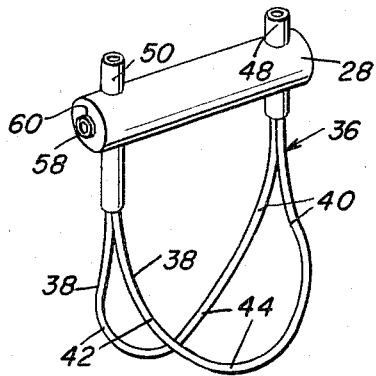
Edgar A. Jordan
INVENTOR.

3,268,967
CHAIN HOOK ATTACHMENT
Edgar A. Jordan, 2510½ Gettle St.,
Klamath Falls, Oreg.
Filed Oct. 19, 1964, Ser. No. 404,588
6 Claims. (Cl. 24—236)

This invention relates to a novel and useful chain hook attachment and more specifically to a hook member of the type including an elongated shank terminating at one end in a backturned hook defining a throat opening between the free end portion of the hook and the adjacent portion of the shank. The attachment of the instant invention includes means by which an article engaged by the hook may be yieldingly retained in engagement with the hook in order that accidental disengagement of the article from the hook will be prevented.

The hook holding device or apparatus of the instant invention is in the form of an attachment for a grab hook and is to be used primarily in connection with grab hooks and not other types of hooks although it is conceivable that the attachment of the instant invention may also prove to be beneficial when utilized in connection with other types of hooks such as a trace hook.

The main object of this invention is to provide an attachment for a grab hook which will be operative to prevent accidental disengagement of a member engaged by the grab hook.

Still another object of this invention is to provide an article holding device specifically designed for use in connection with grab hooks and including yieldable portions extending across the throat of the grab hook to which it is secured thereby blocking movement of an article engaged with the grab hook outwardly through the throat portion of the hook defined between the free end of the backturned hook portion and the adjacent portions of the shank of the hook or hook member.

Still another object of this invention is to provide a grab hook attachment, in accordance with the preceding objects, constructed in a manner whereby it may be readily secured to substantially all types of grab hooks.

Yet another object of this invention is to provide an attachment for a grab hook in accordance with the preceding objects and which includes means for fixedly securing the attachment to an associated grab hook and yet which will enable the attachment to be readily removed from the grab hook.

A final object of this invention to be specifically enumerated herein is to provide a grab hook attachment in accordance with the preceding objects which will conform to conventional forms of manufacture, be of simple construction and easy to use so as to provide a device that will be economically feasible, long-lasting and relatively troublefree in operation.

FIGURE 1 is a front elevational view of the grab hook to which the attachment of the invention is operatively secured;

FIGURE 2 is a side elevational view of the embodiment illustrated in FIGURE 1; and FIGURE 3 is a perspective view of the attachment of the instant invention.

Referring now more specifically to the drawings the numeral 10 generally designates a conventional form of grab hook member including an elongated shank 12 terminating at one end in a backturned hook 14 defining a throat 16 between the free end of the hook 14 and the adjacent portions of the shank 12.

The end of the shank 12 remote from the hook 14 is bifurcated as at 18 and includes a pair of furcations 20 and 22 which are disposed in the median plane of the hook member or grab hook 10. The furcations 20 and 22 are provided with aligned bores 24 and 26, respectively, and a pivot pin 28 is secured through the bores 24 and 26.

The end link 30 of a link chain 32 is disposed between the furcations 20 and 22 and the pivot pin 28 extends through the end link 30 so as to pivotally secure the grab hook 10 to the end link 30 of the chain 32.

The attachment of the instant invention is generally designated by the reference numeral 36 and includes a pivot pin 28 which is somewhat modified in relation to conventional grab hook pivot pins.

The attachment 36 includes a pair of resilient generally U-shaped members 38 each including a pair of arms 40 and 42 interconnected at one pair of corresponding ends by means of a curved bight portion 44. The arms 40 and 42 and the bight portion 44 of each U-shaped member 38 are integrally formed and it may be seen that the U-shaped members 38 are disposed on opposite sides of the shank 12 and that the free ends of the arms 40 are secured together in a sleeve 48 while the free ends of the arms 42 are secured together in a sleeve 50.

The pivot pin 28 includes a pair of diametric bores 54 and 56 which are formed through the portions of the pivot pin 28 projecting outwardly beyond the remote sides of the furcations 22 and 20. The sleeves 48 and 50 are secured through the bores 54 and 56, respectively, by means of a pair of setscrews 58 threadedly engaged in longitudinal blind bores 60 formed in the opposite ends of the pivot pin 28 and communicating with the bores 54 and 56.

The closed ends of the U-shaped members 38 are slightly laterally deflected by and to one side of the portion of the hook member 10 defining the throat 16 and are also disposed alongside these portions of the hook member 10 with at least portions of the bight portion 44 projecting into the throat 16 and substantially blocking the latter.

Accordingly, it may be seen that a chain link disposed in the hook member 10 may be yieldingly retained in operative engagement therewith against accidental withdrawal through the throat 16.

Although a pair of U-shaped members 38 have been illustrated and described herein, it is to be noted that a single U-shaped member 38 can be operative to perform the desired function without the benefit of the second U-shaped member 38.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a hook member including an elongated shank terminating at one end in a backturned hook defining a throat opening between the free end portion of said hook and said shank, an attachment for preventing accidental withdrawal of a member from said hook through said throat, said hook member defining a medial plane, said attachment including a resilient generally U-shaped member including a pair of arms interconnected at one pair of corresponding ends by means of a bight portion, means securing the other pair of corresponding ends of said arms to opposite sides of the end of said shank remote from said backturned hook with the medial planes of said hook member and said U-shaped member generally paralleling each other and the closed end of said U-shaped member slightly laterally deflected by and to one side of the portions of said hook member defining said throat and disposed alongside said portions with at least portions of said bight portion extending at least substantially across the said throat and substantially blocking the latter.

2. The combination of claim 1 wherein said hook member includes a second U-shaped member corresponding to the first-mentioned U-shaped member and disposed on the side of said hook member remote from said first-mentioned U-shaped member.

3. The combination of claim 1 wherein the end of said shank remote from said hook includes an endwise opening bifurcated end portion whose furcations are disposed in said medial plane of said hook member, said furcations having aligned bores formed therethrough and a pivot pin secured through said bores adapted to pivotally support said hook member from one end of a given tension member.

4. The combination of claim 3 wherein said pivot pin projects outwardly beyond the remote sides of said furcations and the outwardly projecting portions thereof include corresponding generally diametric bores in which said other pair of said arms are secured and comprise said means securing said U-shaped member to said shank.

5. The combination of claim 4 wherein said hook member includes a second U-shaped member corresponding to the first-mentioned U-shaped member and disposed on the side of said hook member remote from said first-mentioned U-shaped member, the free ends of the arms of said second U-shaped member also being secured in said corresponding bores.

6. The combination of claim 1 wherein said U-shaped member is constructed of flexible but resilient steel cable.

References Cited by the Examiner
UNITED STATES PATENTS

| | | | |
|---|---|---|---|
| 1,061,435 | 5/1913 | Witt | 24—241 |
| 1,742,569 | 1/1930 | Barker et al. | 24—236 X |

FOREIGN PATENTS

| | | |
|---|---|---|
| 741,573 | 12/1932 | France. |
| 522,185 | 6/1940 | Great Britain. |

WILLIAM FELDMAN, *Primary Examiner.*

D. GRIFFIN, *Assistant Examiner.*